United States Patent
Kobayashi

(10) Patent No.: US 10,630,982 B2
(45) Date of Patent: Apr. 21, 2020

(54) ENCODING APPARATUS, ENCODING METHOD, AND NON-TRANSITORY COMPUTER-READABLE STORAGE MEDIUM FOR PERFORMING ENCODING WITH QUANTIZATION PARAMETERS ACCORDING TO A FEATURE OF AN IMAGE

(71) Applicant: CANON KABUSHIKI KAISHA, Tokyo (JP)

(72) Inventor: Yukifumi Kobayashi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 74 days.

(21) Appl. No.: 15/895,508

(22) Filed: Feb. 13, 2018

(65) Prior Publication Data
US 2018/0241996 A1    Aug. 23, 2018

(30) Foreign Application Priority Data
Feb. 20, 2017    (JP) ................... 2017-029229

(51) Int. Cl.
*H04B 1/66*    (2006.01)
*H04N 7/12*    (2006.01)
(Continued)

(52) U.S. Cl.
CPC ........ *H04N 19/124* (2014.11); *H04N 19/137* (2014.11); *H04N 19/159* (2014.11); *H04N 19/18* (2014.11)

(58) Field of Classification Search
CPC .................... H04N 19/124; H04N 19/14
See application file for complete search history.

(56) References Cited

U.S. PATENT DOCUMENTS 8,064,517 B1 * 11/2011 Viscito ............... H04N 19/176
375/240.03
10,123,021 B2 * 11/2018 Hiwatashi ............ H04N 19/176
(Continued)

OTHER PUBLICATIONS

PixelTools Corporation. "Rate Control and H.264." Comprehensive Solutions and Products for Video Compressionists—PixelTools, Nov. 14, 2016, https://web.archive.org/web/20161114100523/http://www.pixeltools.com/rate_control_paper.html) (Year: 2016).*
(Continued)

*Primary Examiner* — Fabio S Lima
(74) *Attorney, Agent, or Firm* — Cowan, Liebowitz & Latman, P.C.

(57) ABSTRACT

An encoding apparatus, comprising a detecting unit configured to detect a feature of an image of each block configuring a still image of an image to be encoded, a setting unit configured to set an image quality mode for encoding the image to be encoded, a deciding unit configured to, for each block, decide a quantization parameter based on the detected feature and the image quality mode, a generating unit configured to, for each block, generate a difference image by performing an intra-prediction, a transformation unit configured to generate transform coefficients by performing an orthogonal transformation on the difference image, and an encoding unit configured to encode the image to be encoded and including a quantizing unit configured to quantize the transform coefficients by using the decided quantization parameter.

11 Claims, 4 Drawing Sheets

(51) Int. Cl.
*H04N 11/02* (2006.01)
*H04N 11/04* (2006.01)
*H04N 19/124* (2014.01)
*H04N 19/159* (2014.01)
*H04N 19/137* (2014.01)
*H04N 19/18* (2014.01)

(56) References Cited

U.S. PATENT DOCUMENTS

| | | | | |
|---|---|---|---|---|
| 2006/0262848 | A1* | 11/2006 | Togita | H04N 19/61 |
| | | | | 375/240.03 |
| 2009/0086816 | A1* | 4/2009 | Leontaris | H04N 19/80 |
| | | | | 375/240.03 |
| 2009/0110063 | A1* | 4/2009 | Nakayama | H04N 19/176 |
| | | | | 375/240.03 |
| 2011/0109753 | A1* | 5/2011 | Srinivasamurthy | H04N 19/46 |
| | | | | 348/208.4 |
| 2011/0299790 | A1* | 12/2011 | Chan | H04N 19/126 |
| | | | | 382/239 |
| 2014/0286403 | A1* | 9/2014 | Nishitani | H04N 19/463 |
| | | | | 375/240.03 |
| 2016/0073111 | A1* | 3/2016 | Lee | H04N 19/124 |
| | | | | 375/240.03 |
| 2017/0070745 | A1* | 3/2017 | Lee | H04N 19/513 |

OTHER PUBLICATIONS

Impress Japan, "H.265/HEVC Textbook", issued Oct. 21, 2013, (Partial Translation) Cited in Specification in paragraph [0002].

* cited by examiner

| IMAGE QUALITY MODE | QUANTIZATION VALUE | | |
|---|---|---|---|
| | LOW COMPLEXITY | MEDIUM COMPLEXITY | HIGH COMPLEXITY |
| SUPER FINE | 6 | 10 | 14 |
| FINE | 11 | 15 | 19 |
| NORMAL | 16 | 20 | 24 |

FIG. 5

| IMAGE QUALITY MODE | QUANTIZATION VALUE | | | |
|---|---|---|---|---|
| | LOW COMPLEXITY | MEDIUM COMPLEXITY | HIGH COMPLEXITY | EDGE |
| SUPER FINE | 6 | 10 | 14 | 8 |
| FINE | 11 | 15 | 19 | 13 |
| NORMAL | 16 | 20 | 24 | 18 |

ENCODING APPARATUS, ENCODING METHOD, AND NON-TRANSITORY COMPUTER-READABLE STORAGE MEDIUM FOR PERFORMING ENCODING WITH QUANTIZATION PARAMETERS ACCORDING TO A FEATURE OF AN IMAGE

BACKGROUND OF THE INVENTION

Field of the Invention

The present invention relates to an encoding apparatus, an encoding method, and a non-transitory computer-readable storage medium.

Description of the Related Art

An HEVC (High Efficiency Video Coding) encoding method is an international encoding standard for moving images. The HEVC encoding method is a moving image encoding method, but a still image profile has been newly introduced as a profile for encoding still images (refer to Impress Japan, "H.265/HEVC Textbook", issued Oct. 21, 2013). Consequently, the future spread of still image files that use HEVC is expected.

In JPEG (Joint Photographic Experts Group), which is a general-purpose encoding specification for still images, a quantization parameter is fixed within a frame, and a quantization table is prepared for each image quality mode such as normal or fine. However, control such as changing the quantization table in accordance with the complexity of an image is not performed. This is because the image quality level is fixed for each image quality mode.

It is possible to consider applying a similar way of thinking in HEVC, to fix a quantization parameter qP across an entire frame for each image quality mode, and to make the quantization parameter of all CUs (Coding Units) in the frame be the same.

However, in a case where encoding is performed by fixing the quantization parameter within a frame, a portion where degradation is noticeable as a visual characteristic and a portion where degradation is not noticeable are processed using the same parameter, and it becomes difficult to provide a satisfactory still image for which the image quality of a portion where degradation is noticeable is improved.

SUMMARY OF THE INVENTION

The present invention provides a technique that enables provision of a still image of good image quality in consideration of visual characteristics.

One aspect of embodiments of the invention relates to an encoding apparatus, comprising a detecting unit configured to detect a feature of an image of each block configuring a still image of an image to be encoded, a setting unit configured to set an image quality mode for encoding the image to be encoded, a deciding unit configured to, for each block, decide a quantization parameter based on the detected feature and the image quality mode, a generating unit configured to, for each block, generate a difference image by performing an intra-prediction, a transformation unit configured to generate transform coefficients by performing an orthogonal transformation on the difference image, and an encoding unit configured to encode the image to be encoded and including a quantizing unit configured to quantize the transform coefficients by using the decided quantization parameter.

Further features of the invention will become apparent from the following description of exemplary embodiments (with reference to the attached drawings).

BRIEF DESCRIPTION OF THE DRAWINGS

FIG. 5 is a view which illustrates another example of a quantization parameter table corresponding to an embodiment of the invention.

DESCRIPTION OF THE EMBODIMENTS

Embodiments of the invention will be described below in detail with reference to the drawings.

First Embodiment

Figure 1:
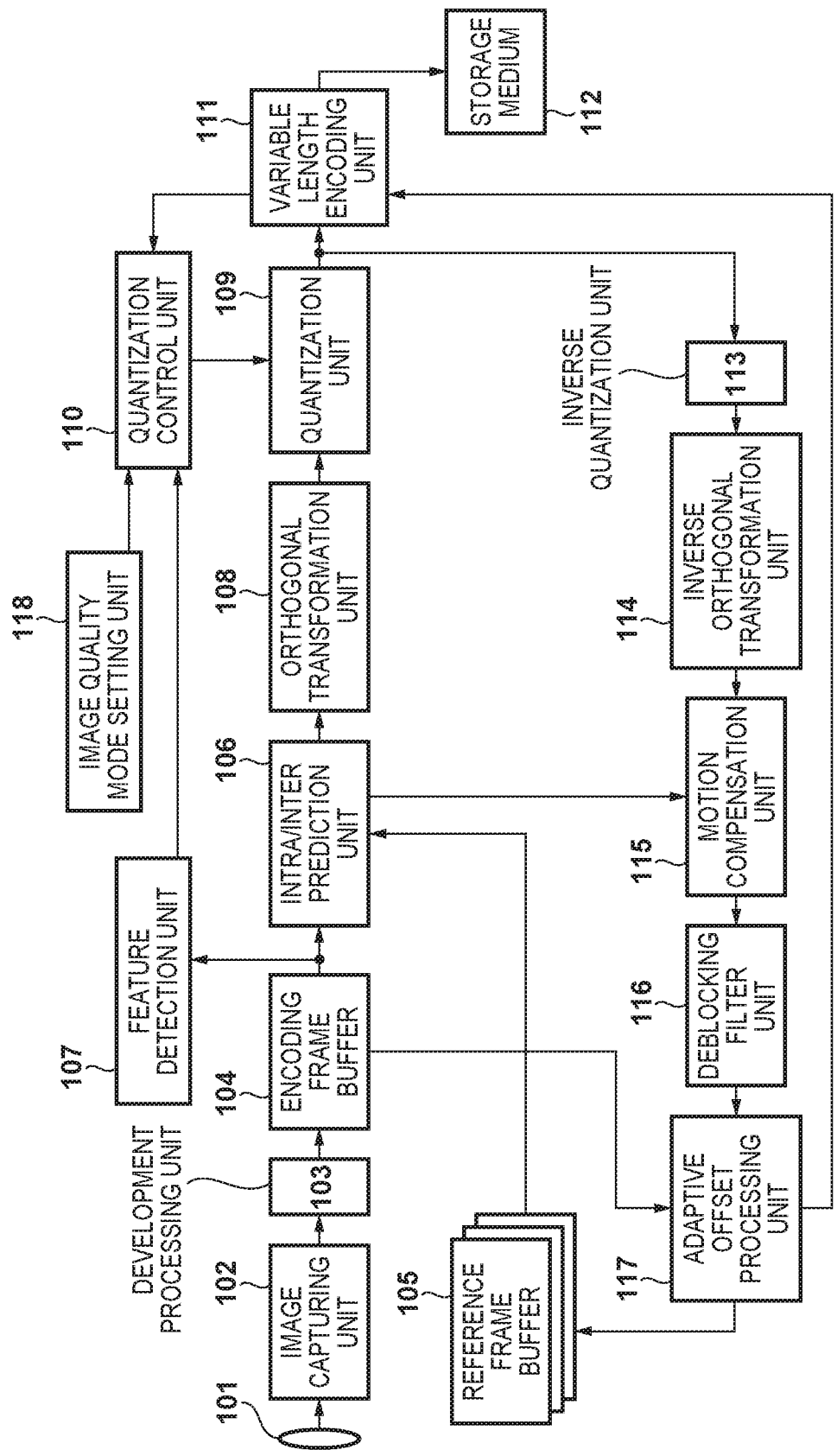
FIG. 1 is a block diagram which illustrates a configuration example of an encoding apparatus corresponding to an embodiment of the invention.

FIG. 1 is a block diagram which illustrates a configuration example of an encoding apparatus corresponding to an embodiment of the invention. Here, an example of an encoding apparatus 100 in which an HEVC encoding method is realized is illustrated. In the description of embodiments hereafter, a digital camera is given as an example of the encoding apparatus 100 in the description, but embodiments of the encoding apparatus 100 are not limited to digital cameras. For example, the encoding apparatus 100 can be made to be any information processing apparatus, an image capturing apparatus, information generation apparatus, or data generation device having an imaging function or a recording function, such as a personal computer, a mobile phone, a smart phone, a PDA, a tablet device, a digital video camera, a mobile media player, or the like. Hereinafter, with reference to FIG. 1, first, description regarding an operation of the encoding apparatus 100 at the time of movie recording will be given.

<Operation at the Time of Movie Recording>

A captured image passes through a lens 101 and is inputted into an image capturing unit 102. The lens 101 is configured to include an optical lens unit and an optical system for controlling an aperture/zooming/focusing, for example. Also, the image capturing unit 102 is configured by an image capturing element for converting light (an image) that is introduced via an optical lens unit into an electrical video signal. As an image capturing element, typically a CMOS (Complementary Metal Oxide Semiconductor) or a CCD (Charge Coupled Device) is used. The image capturing unit 102 converts subject light formed on the lens 101 into an electrical signal by an image capturing element, performs noise reduction processing or the like, and outputs digital pixel data as image data. In the present embodiment of the encoding apparatus 100, image data is stored in a storage medium 112 in accordance with a DCF (Design Rule for Camera File system) specification. In the present embodiment, the image capturing unit 102 is included as a constituent element because the description is given using a digital camera as an example of the encoding apparatus 100, but the encoding apparatus 100 need not be configured to necessarily include the image capturing unit 102.

The image data which is outputted from the image capturing unit 102 is sent to a development processing unit 103. The development processing unit 103 performs various image processing such as debayer processing, defect correction, noise removal, resizing processing, and color conversion to a YCbCr format. The image data, which after image processing is in a format in which compression encoding is possible, is inputted into an encoding frame buffer 104. This image data is referred to as an "image to be encoded". Also, image data for which encoding was completed in the past and which is used as a reference image is stored in a reference frame buffer 105 and this is referred to as a "reference image".

In an intra/inter prediction unit 106, for each block intra-prediction (intra-frame prediction) and inter-prediction (inter-frame prediction) is performed. In an intra-prediction operation, a prediction mode is decided by performing an intra-prediction using an image to be encoded that is stored in the encoding frame buffer 104 and neighboring images within the frame that are saved in the intra/inter prediction unit 106 and have already been encoded previously. When the prediction mode is decided, a difference in pixels between an image to be encoded and an intra-prediction image of the prediction mode that was decided is taken, and a difference image is generated. Also, block matching is performed in the inter-prediction operation between the image to be encoded which is stored in the encoding frame buffer 104 and a reference image which is stored in the reference frame buffer 105, and motion vector detection is performed. A difference in pixels between the image to be encoded and a prediction image for a detected motion vector position is taken, and a difference image is generated.

The intra/inter prediction unit 106 selects the prediction method whose coding efficiency will be better based on the difference images generated in the intra-prediction and the inter-prediction, and outputs the difference image of the selected prediction method to an orthogonal transformation unit 108. The intra/inter prediction unit 106 outputs to a motion compensation unit 115 the prediction image for the motion vector detection position for generation of a local decode image or the prediction image of the intra-prediction.

A feature detection unit 107 acquires the image to be encoded which is stored in the encoding frame buffer 104 and detects a feature of a block to be encoded. Feature information indicating the detected feature is sent to a quantization control unit 110 because this feature information is used for quantization control. The orthogonal transformation unit 108 performs a discrete cosine transformation on the inputted difference image, generates transform coefficients, and outputs the transform coefficients to a quantization unit 109. In the quantization unit 109, in relation to the transform coefficients provided from the orthogonal transformation unit 108, quantization is performed in accordance with a quantization step size that the quantization control unit 110 outputs. The quantized transform coefficients are outputted to a variable length encoding unit 111 for generating an encoded stream and an inverse quantization unit 113 for generating a local decode image.

In the variable length encoding unit 111, variable length encoding is performed by performing a zigzag scan, an alternate scan, or the like, on the transform coefficients after quantization. An encoded stream is generated by adding thereto the result of performing variable-length encoding on encoding method information such as a motion vector, a quantization step size, block division information, and a parameter for adaptive offset processing. The generated encoded stream is stored in the storage medium 112. Also, a generated code amount for each block is calculated when encoding, and the generated code amount is outputted to the quantization control unit 110.

The quantization control unit 110 uses the generated code amount inputted from the variable length encoding unit 111, and decides a tentative quantization step size (Qstep_pre) so as to achieve a target code amount. Thereafter, the quantization step size (Qstep) is decided in accordance with the feature information inputted from the feature detection unit 107. For example, in a case where an image frequency component is used as a feature, it is a visual characteristic that image degradation becomes less noticeable the more high frequency components there are, and therefore the quantization step size is made to be larger. Conversely, in a case where there are many low frequency components, it is visual characteristic that image degradation is noticeable, and therefore the quantization step size is made smaller. A parameter for changing such a quantization step size is referred to as "activity".

"activity" is a parameter that can take any value between "0.5" and "2", and takes the value "1" with average frequency components, and is made to have a value that is larger than "1" in a case of more high-frequency components, and made to have a value smaller than "1" in a case of more low-frequency components. Also, so that the target code amount is easily met, the amount of increase or decrease of the "activity" is decided from the feature amounts of the entire frame. Using this parameter, Qstep is calculated by Equation (1).

$$Qstep = Qstep\_pre \times activity \quad (1)$$

By Equation (1), even if the generated code amount is large and Qstep_pre became a large value, in a case where "activity" indicates many low frequency components, the value of Qstep is modified to be a smaller value, and the quantization step size is adjusted so that image degradation in low frequency components is not noticeable. Also, by Equation (1), even if the generated code amount is small and Qstep_pre became a small value, in a case where "activity" indicates many high frequency components, the value of Qstep is modified to be a larger value, and the code amount can be reduced considering the features of the image since the certain amount of image degradation is not a problem in a case of many high frequency components. The quantization step size (Qstep) thus decided is outputted to the quantization unit 109. Also, the quantization step size (Qstep) is converted into a quantization parameter qP, and included in the header of the encoded stream.

In the inverse quantization unit 113, an inverse quantization is performed with respect to post-quantization transform coefficients sent from the quantization unit 109, and the transform coefficients for a local decode are generated. These transform coefficients are outputted to an inverse orthogonal transformation unit 114.

In the inverse orthogonal transformation unit 114, a difference image is generated by performing an inverse discrete cosine transform on the transform coefficients inputted from the quantization unit 109. The generated difference image is outputted to the motion compensation unit 115. In the motion compensation unit 115, image data for a local decode is generated by adding a prediction image sent from the intra/inter prediction unit 106 and a difference image sent from the inverse orthogonal transformation unit 114. The generated image data is outputted to a deblocking filter unit 116.

In the deblocking filter unit 116, a de-blocking filter is applied to inputted image data. The post-de-blocking-filter image is outputted to an adaptive offset processing unit 117. In the adaptive offset processing unit 117, band offset processing, edge offset processing, or no processing is selected, and a band position, an edge direction, an offset value, or the like for which to perform adaptive offset processing is decided. In the reference frame buffer 105, the result of performing adaptive offset processing on the post-de-blocking-filter image is stored as a local decode image. Also, because parameters for adaptive offset processing such as what processing is selected as the adaptive offset processing, the band position, the edge direction, and the offset value are generated as part of the encoded stream, these parameters are outputted to the variable length encoding unit 111.

By such operation, an encoded stream and a local decode image are generated for the time of moving image recording. Note that an image quality mode setting unit 118 performs image quality mode setting for still images, and will be described in detail later.

<Operation at the Time of Still Image Recording>

Next, operation at the time of still image recording will be described. At the time of still image recording, only intra-prediction is performed in the intra/inter prediction unit 106 because there is only one image to be encoded. Description is given regarding quantization control in still image recording. When recording a moving image, the quantization step size Qstep is decided to match a target code amount.

Meanwhile in still image recording, in conventional JPEG encoding, it is typical for quantization processing to be performed using a quantization table set in advance in accordance with an image quality mode. For example, in the case where there are three image quality modes of "normal", "fine", and "super fine", it is decided in advance to use quantization table 1 in normal mode, quantization table 2 in fine mode, and quantization table 3 in super fine mode. This is to fix the image quality level in each image quality mode since the image quality is substantially decided depending on the quantization table.

It is possible to consider applying a similar way of thinking to HEVC to fix the quantization step size (quantization parameter) in accordance with the image quality mode. In the HEVC encoding method, similarly to the AVC/H.264 method, the concept of a value (quantization parameter) proportional to a logarithm of the quantization step size is used. The value of the quantization parameter qP is set between 0 and 51, and below, a case of performing quantization control by adjusting the value of the quantization parameter qP at the time of still image recording will be described. For example, in the normal mode, the quantization parameter qP=20 is set, in the fine mode, the quantization parameter qP=15 is set, and in the super fine mode, the quantization parameter qP=10 is set. Consequently, it is possible to fix the image quality level in accordance with the image quality mode.

However, since a quantization parameter within the frame is fixed in the case of controlling in this fashion, the same quantization parameter qP ends up being used for parts as a visual characteristic image degradation will be noticeable and parts for which image degradation will not be noticeable, and therefore an image with good visual characteristics will not necessarily be achieved. Accordingly, in the present embodiment, rather than fixing the quantization parameter within a frame, quantization control is executed so as to assign a quantization parameter in accordance with a feature of the image to be encoded.

Figures 2, 3:
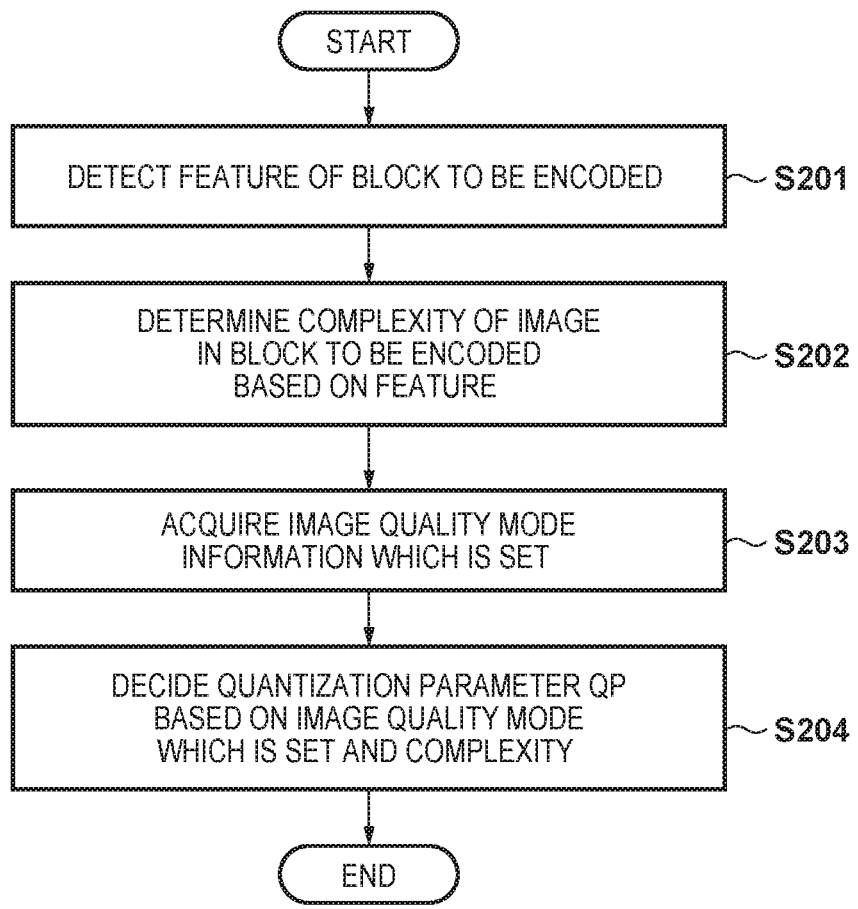
FIG. 2 is a flowchart which corresponds to an example of quantization control processing corresponding to an embodiment of the invention.
FIG. 3 is a view which illustrates an example of a quantization parameter table corresponding to an embodiment of the invention.

Operation related to quantization control in the present embodiment will be described. FIG. 2 is a flowchart which illustrates an example of quantization control processing corresponding to an embodiment. Processing corresponding to this flowchart can be realized by one or more processors, which function for example as the feature detection unit 107, the image quality mode setting unit 118, and the quantization control unit 110, executing a corresponding program (stored in a ROM or the like).

First, in step S201, the feature detection unit 107 detects a feature of a block to be encoded. Various things can be considered for the feature of the image, but here a variance value of the image is detected as a feature that represents the complexity of the image. In the present embodiment, first, an average value of pixels in the block is obtained as a value resulting from dividing a total of pixel values in the block by the number of pixels that configure the block. Then, the variance value of pixels in the block is obtained as a value resulting from dividing the total of the differences between each pixel value in the block and the average value of the pixels by the number of pixels that configure the block. For example, in a case where the block size is 16×16, and there are 256 pixel values from P1 to P256, the average value of the pixels Pmean and the variance value of the pixels Var can be calculated by Equation (2) and Equation (3) below.

$$P_{mean} = \frac{1}{256} \times \sum_{k=1}^{256} P_k \qquad (2)$$

$$Var = \frac{1}{256} \times \sum_{k=1}^{256} (P_k - P_{mean})^2 \qquad (3)$$

Next, in step S202, the feature detection unit 107 determines the level of the complexity of the image of the block to be encoded based on the calculated variance value. It is possible to detect a plurality of complexity stages, and in the present embodiment, the complexity is determined using three stages or levels (high, medium, low). An image is treated as being more complicated the higher the variance value is. Specifically, thresholds Vth1 and Vth2 are set in relation to the variance value Var, and a high complexity is assumed when Var>Vth1, a medium complexity is assumed when Vth1≥Var>Vth2, and a low complexity is assumed when Vth2≥Var.

The feature detection unit 107 provides complexity information, which is the result of the complexity determination, to the quantization control unit 110 as a feature of the block to be encoded. Note that the complexity is converted to one of the three stages (levels) here, but, for example, the threshold interval may be made narrower and a finer classification into say ten stages is also possible; the number of stages may be set as appropriate.

Next, in step S203, the quantization control unit 110 acquires from the image quality mode setting unit 118 still-image image-quality-mode information that has been set. The image quality mode setting unit 118 sets the image quality mode for still images in accordance with a user operation. For example, a setting of normal, fine, super fine, or the like is made, and image quality mode information is outputted to the quantization control unit 110. In the present embodiment, a three-stage setting is assumed to be made, and super fine is a mode in which image quality is highest and the code amount is largest, fine mode is a mode in which image quality is reduced and the code amount is decreased more than in the super fine mode, and normal mode is a mode in which the image quality is reduced and the code amount decreased even more than in fine mode. The example of having three image quality modes was given, but configuration may be taken to separate the image quality level finely into ten stages, as in mode 1 to mode 10, for example.

Next, in step S204, the quantization control unit 110 decides the quantization parameter qP in accordance with the image quality mode information acquired from the image quality mode setting unit 118 and the complexity information acquired from the feature detection unit 107. The value of the quantization parameter can be decided in advance in accordance with the respective complexity for each image quality mode. Alternatively, a calculation rule may be decided, and the values modified in accordance with complexity information. At that time, there is the visual characteristic that image degradation becomes less noticeable the more complicated the image is, and therefore a larger value is set as the quantization parameter the more complicated it is, and a smaller value is set as the quantization parameter the less complicated it is. For example, in a case where the quantization parameter for medium complexity in super fine mode is decided to be 10, it is possible to decide the quantization parameter such that the quantization parameter of high complexity>the quantization parameter of medium complexity>the quantization parameter of low complexity, for example 14 for high complexity, and 6 for low complexity. Alternatively, configuration may also be taken such that using the quantization parameter (10 in the present embodiment) of medium complexity which is an intermediate stage as a reference, a predetermined value (4 in the present embodiment) is added to the quantization parameter for high complexity, and a predetermined value is subtracted for the quantization parameter of low complexity.

Similarly, in fine mode, the image quality level is reduced and the code amount decreased more than in super fine mode, and therefore it is possible to set a larger quantization parameter than in super fine mode for each complexity such that medium complexity is 15, high complexity is 19, and low complexity is 11. Also, since in normal mode, the image quality level is lowered more than in fine mode, it is possible to set the quantization parameter to 20 for medium complexity, 24 for high complexity, and 16 for low complexity.

In the above described example, the value in the case where the quantization parameter qP is assigned fixedly for each image quality mode is assigned for medium complexity, and the quantization parameter for low complexity and high complexity are increased or decreased with that value as a reference. In a case where control of the quantization parameter is not performed adaptively within a frame at that time, it is possible to control so as to use only the value for medium complexity. Also, configuration may be taken so as to arbitrarily replace the modes for switching the quantization parameter in accordance with image complexity with fixed modes.

An example of settings for the quantization parameter in each complexity for each mode is illustrated in FIG. 3. In the quantization control unit 110, in accordance with the setting of the quantization parameter of FIG. 3, a quantization parameter is selected in accordance with the image quality mode and the complexity of the block to be encoded. The quantization step size in accordance with the selected quantization parameter is sent to the quantization unit 109, and quantization processing is performed.

Thus, in the present embodiment, at the time of the still image encoding, the complexity is detected using a variance value for each block of the image, and it is possible to perform encoding of the image to be encoded by performing quantization processing based on the quantization parameter in accordance with the complexity in each image quality mode. Consequently, even in the same image quality mode, it is possible to switch the quantization parameter for parts in which degradation will be noticeable as a visual characteristic and parts in which degradation will not be noticeable, and therefore it is possible to suppress image quality variation within an image in the same image quality mode. Also, since the quantization parameter is set in accordance with the complexity, it is possible to perform quantization processing that considers visual characteristics.

Second Embodiment

In the first embodiment described above, the case where a variance value is used as the feature of the image is described. In contrast to this, in the present embodiment, a case in which a frequency component is used rather than the variance value as the feature of the image for each block will be described. Here, mainly, differences from the first embodiment will be described. When encoding a still image, the feature detection unit 107 converts a pixel block into frequency components by performing a frequency conversion. A DCT (Discrete Cosine Transform) and a Hadamard transform or the like are examples of methods of frequency conversion. Here, a description is given using a Hadamard transform as the method of frequency conversion, but any frequency conversion method may be used if it can perform a conversion into frequency components.

Figure 4:
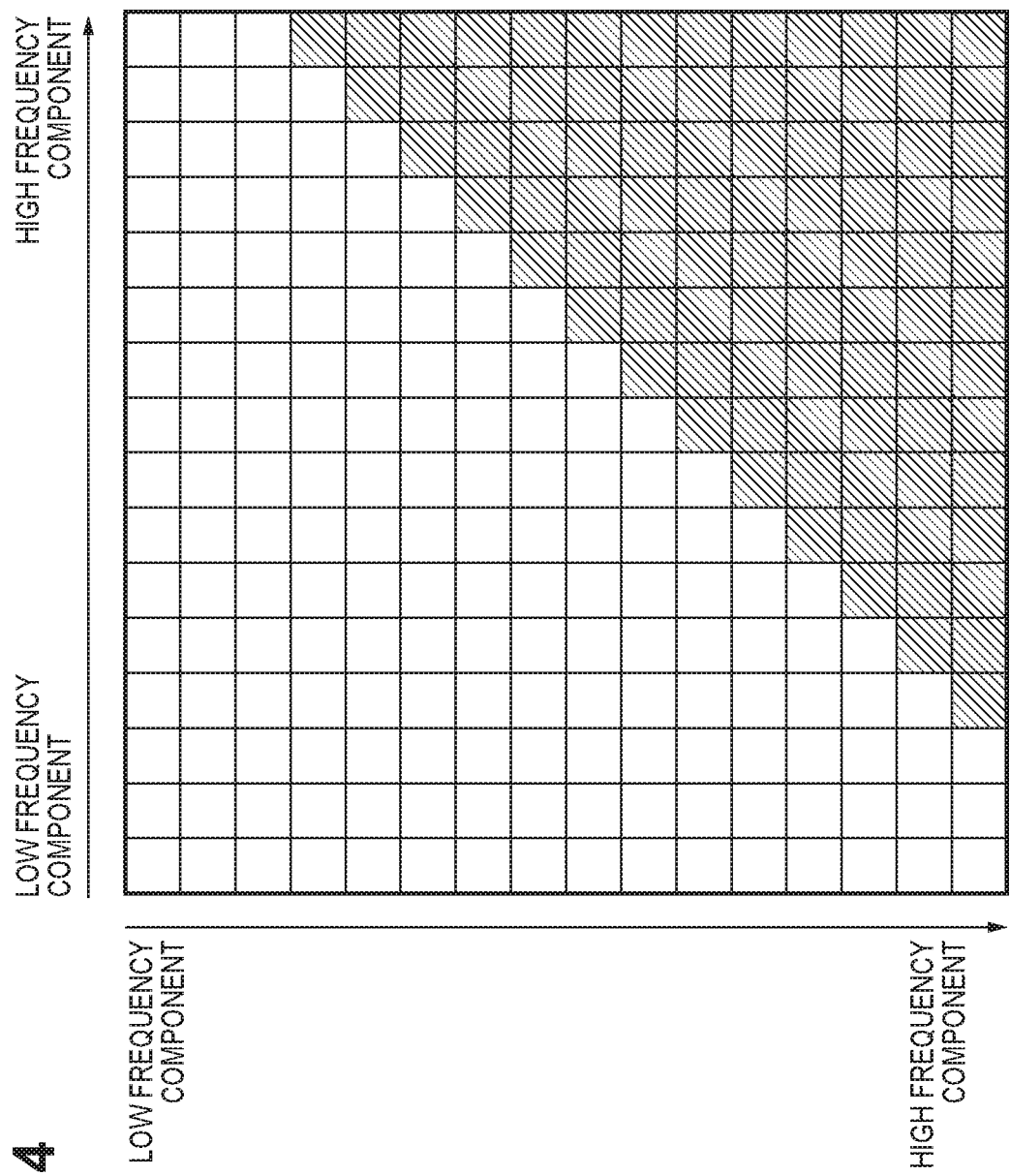
FIG. 4 is a view which illustrates an example of a relationship between a frequency component and a position after frequency conversion corresponding to an embodiment of the invention.

It is assumed that a Hadamard transform is performed in relation to a block of 16×16 pixels. The relationship between the frequency component and the position after the Hadamard transform is illustrated in FIG. 4. After the Hadamard transform, the top-left is direct current components and the closer to the bottom-right the higher frequency the component is. Here, the intensity (amount) of the high frequency component is used as an index that represents the complexity of the image. Components that are to the bottom-right of a particular position are treated as high frequency components, and a total amount for those components is obtained. For example, components in the hatched part of FIG. 4 are treated as high frequency components. Note that the range of the high frequency component is not something that is limited to the example illustrated in FIG. 4, and can change.

In the present embodiment, the sum of absolute difference of the frequency components is calculated for the high frequency components (SAV: Sum of Absolute Values). Based on the calculated high frequency component SAV, the image is converted into complexity levels. The image can be treated as more complex the larger the SAV value is. Accordingly, in step S202 of the flowchart of FIG. 2, the feature detection unit 107 sets the thresholds Sth1 and Sth2 corresponding to the high frequency component SAV, and when SAV>Sth1 it can be determined to be high complexity, when Sth1≥SAV>Sth2 it can be determined to be medium complexity, and when Sth2≥SAV it can be determined to be low complexity. This complexity information is sent to the quantization control unit 110 as a feature of the block to be encoded. In the quantization control unit 110, similarly to the first embodiment, it is possible to encode the image to be encoded by performing quantization processing based on a quantization parameter according to the complexity for each image quality mode.

As described above, when encoding a still image, it is possible to detect the complexity by using the frequency component for each block in the image to be encoded, and it is possible to perform quantization processing based on the quantization parameter in accordance with the complexity of each image quality mode. Consequently, even in the same image quality mode, it is possible to switch the quantization parameter for parts in which degradation will be noticeable as a visual characteristic and parts in which degradation will not be noticeable, and therefore it is possible to suppress image quality variation within an image in the same image quality mode. Also, since the quantization parameter is set in accordance with the complexity, it is possible to perform quantization processing that considers visual characteristics. Also, in the present embodiment, an example of a case in which the Hadamard transform is performed on a size of 16×16 pixels was described, but any size may be used and there is no limitation on the size on which the Hadamard transform is performed.

Third Embodiment

In the present embodiment, description is given for a case in which, in addition to detecting complexity as the image feature for each block, edges are also detected. Here, mainly, differences from the foregoing embodiments are described. In the quantization control processing corresponding to the present embodiment, when encoding a still image, the feature detection unit 107, in step S202 of FIG. 2, performs edge detection in addition to detecting the complexity using the variance value. An edge is a boundary portion between a background portion and a subject portion, for example, or indicates a portion at which spatially there is a rapid change from an even image to a complicated image. There are various publicly known edge detection methods, and any edge detection method may be used in the present embodiment.

Complexity information and edge detection information is provided from the feature detection unit 107 to the quantization control unit 110. The quantization control unit 110 decides the quantization parameter based on the image quality mode information from the image quality mode setting unit 118 and the complexity information and the edge information from the feature detection unit 107.

The quantization parameter, for each image quality mode, can be set in advance for each complexity and for when an edge is detected. Alternatively, each quantization parameter may be calculated by a computation. There is the visual characteristic that image degradation becomes less noticeable the more complicated the image is, and therefore a larger value is set as the quantization parameter the more complicated it is, and a smaller value is set as the quantization parameter the less complicated it is. Since an edge is a comparatively complicated image, there is a high possibility that it will be originally classified as medium or high complexity. However, since degradation is visually noticeable for an edge portion, a smaller value is set as the quantization parameter.

An example of quantization parameter settings for each complexity and for when an edge is detected are illustrated in FIG. 5 for each mode. In addition to the example of quantization parameter settings in the first embodiment, the quantization parameter setting for when an edge is detected is 8 in super fine mode, 13 in fine mode, and 18 in normal mode. Here, the values are slightly smaller than the quantization parameter values for medium complexity which is the reference. It is possible to prioritize edges of complexity. In other words, the quantization parameter for edges is used when an edge is determined to be detected, and the respective quantization parameter for complexity is used if it is not determined that an edge is detected. Here, processing may also be such that it is first determined whether or not an edge was detected, and in a case where an edge was detected, the quantization parameter for when an edge is detected that corresponds to the image quality mode is selected, and in a case where an edge is not detected, a quantization parameter in accordance with the image quality mode and the complexity is selected. Also, control may be such that first an image quality mode and a quantization parameter according to the complexity are selected, and then in a case where an edge is detected, the quantization parameter is changed to a value of the parameter for when an edge is detected.

Also, in the foregoing description, the feature detection unit 107 detects both the complexity and an edge as features, but another configuration may be to detect only edges. In such a case, two sets of quantization parameters may be used for a case where an edge is detected and a case where an edge is not detected. For example, a medium complexity quantization parameter value may be selected in a case where an edge is not detected, and a quantization parameter for an edge may be selected in a case where an edge is detected.

As described above, when encoding a still image, edge and complexity detection is performed for each block of the image, and for each image quality mode, it is possible to perform encoding of an image to be encoded by performing quantization processing based on a quantization parameter according to the edge and the complexity detection. Consequently, it is possible to achieve an image that is good in regards to visual characteristics while suppressing image quality variation for images in the same image quality mode.

Other Embodiments

Embodiments of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-029229, filed on Feb. 20, 2017, which is hereby incorporated by reference herein in its entirety.

What is claimed is:

1. An encoding apparatus, comprising:
one or more processors;
a memory; and
a program stored in the memory which, when executed by the one or more processors, causes the one or more processors to perform:
detecting a complexity of an image, which is one of a plurality of stages, as a feature of an image of each block configuring a still image of an image to be encoded;
setting an image quality mode selected from a plurality of image quality modes for encoding the image to be encoded;
deciding, for each block, a quantization parameter based on the detected feature and the set image quality mode, wherein for each of the plurality of image quality modes, the quantization parameter is decided based on the detected stage of the complexity;
generating, for each block, a difference image by performing an intra-prediction;
generating transform coefficients by performing an orthogonal transformation on the difference image; and
encoding the image to be encoded and including a quantizing unit configured to quantize the transform coefficients by using the decided quantization parameter,
wherein in the deciding, the quantization parameter is decided such that a first variation in the quantization parameter caused by a change from the set image quality mode to a next higher or lower image quality mode of the plurality of image quality modes is larger than a second variation in the quantization parameter caused by a change from the detected stage of complexity of the image to a next higher or lower stage of complexity of the plurality of stages.

2. The encoding apparatus according to claim 1, wherein a variance value of the pixels included in each block is detected as the complexity of the image.

3. The encoding apparatus according to claim 1, wherein a high frequency component intensity that the pixels included in each block have is detected as the complexity of the image.

4. The encoding apparatus according to claim 1, wherein the detecting includes detecting an edge as the feature of the image of each block, and
the deciding includes deciding the quantization parameter based on whether or not an edge was detected.

5. The encoding apparatus according to claim 1, the deciding includes deciding the quantization parameter so that the quantization parameter becomes larger the higher the complexity is.

6. The encoding apparatus according to claim 1, wherein the deciding includes deciding the quantization parameter by using an intermediate stage among the plurality of stages as a reference, making the quantization parameter larger than the quantization parameter used for the intermediate complexity the larger the complexity becomes, and making the quantization parameter smaller than the quantization parameter value used for the intermediate complexity the smaller the complexity becomes.

7. The encoding apparatus according to claim 1, wherein the detecting includes performing edge detection for each block, and
the deciding includes, for a block for which an edge is detected, deciding the quantization parameter prioritizing a quantization parameter based on the detected edge over a quantization parameter based on the complexity.

8. The encoding apparatus according to claim 7, wherein the deciding includes deciding the quantization parameter to be set for the block for which the edge was detected such that the quantization parameter value is smaller than in a case where the complexity of the image is a predetermined complexity.

9. The encoding apparatus according to claim 1, wherein the deciding includes deciding the quantization parameter so as to select a quantization parameter that changes a quantization parameter assigned fixedly for the still image.

10. An encoding method, comprising:
detecting a complexity of the image, which is one of a plurality of stages, as a feature of an image of each block configuring a still image of an image to be encoded;
setting an image quality mode selected from a plurality of image quality modes for encoding the image to be encoded;
deciding, for each block, a quantization parameter based on the detected feature and the set image quality mode, wherein for each of the plurality of image quality modes, the quantization parameter is decided based on the detected stage of the complexity;
generating, for each block, a difference image by performing an intra-prediction;
generating transform coefficients by performing an orthogonal transformation on the difference image; and
encoding the image to be encoded by quantizing the transform coefficients by using the decided quantization parameter,
wherein in the deciding, the quantization parameter is decided such that a first variation in the quantization parameter caused by a change from the set image quality mode to a next higher or lower image quality mode of the plurality of image quality modes is larger than a second variation in the quantization parameter caused by a change from the detected stage of complexity of the image to a next higher or lower stage of complexity of the plurality of stages.

11. A non-transitory computer-readable storage medium storing a program that, when executed by a processor of an image processing apparatus causes the processor to perform a method, the method comprising:
detecting a complexity of the image, which is one of a plurality of stages, as a feature of an image of each block configuring a still image of an image to be encoded;
setting an image quality mode selected from a plurality of image quality modes for encoding the image to be encoded;
deciding, for each block, a quantization parameter based on the detected feature and the set image quality mode, wherein for each of the plurality of image quality modes, the quantization parameter is decided based on the detected stage of the complexity;

generating, for each block, a difference image by performing an intra-prediction;

generating transform coefficients by performing an orthogonal transformation on the difference image; and encoding the image to be encoded by quantizing the transform coefficients by using the decided quantization parameter, wherein in the deciding, the quantization parameter is decided such that a first variation in the quantization parameter caused by a change from the set image quality mode to a next higher or lower image quality mode of the plurality of image quality modes is larger than a second variation in the quantization parameter caused by a change from the detected stage of complexity of the image to a next higher or lower stage of complexity of the plurality of stages.

* * * * *